May 29, 1928. T. ROBINSON Re. 16,983
ROOFING ELEMENT
Original Filed April 10, 1925
Fig. 1,
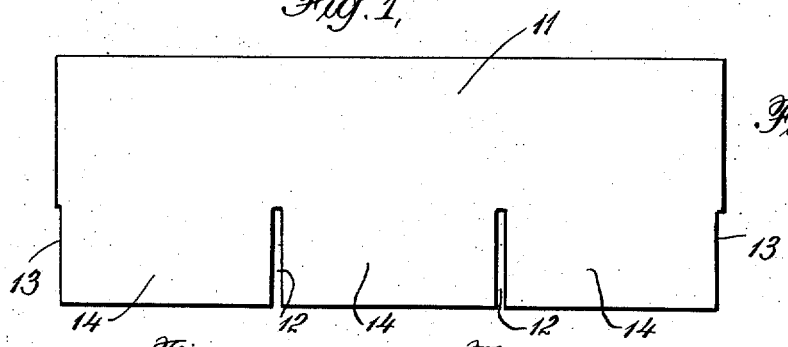
Fig. 4.
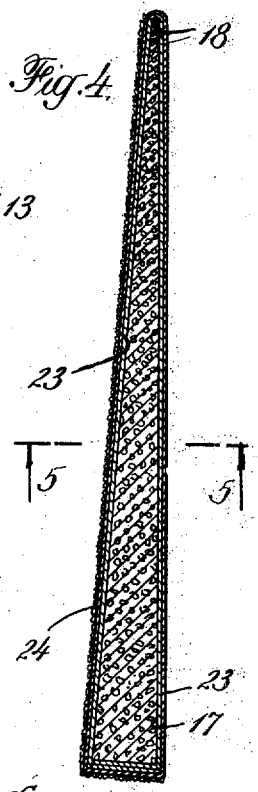
Fig. 2
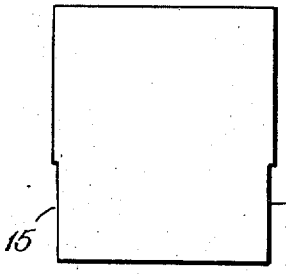
Fig. 3,
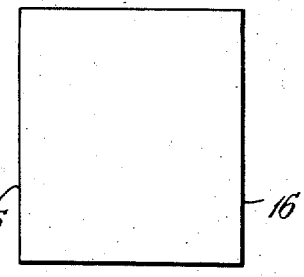
Fig. 5,
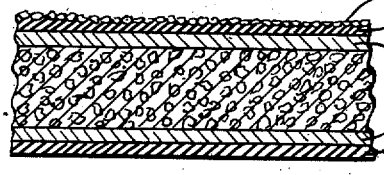
Fig. 6,
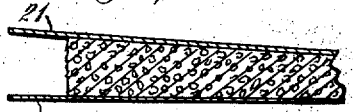
Fig. 7,
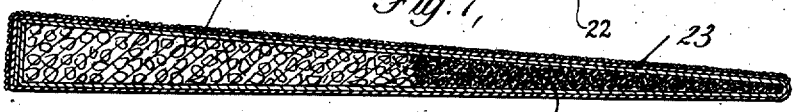
Fig. 8,
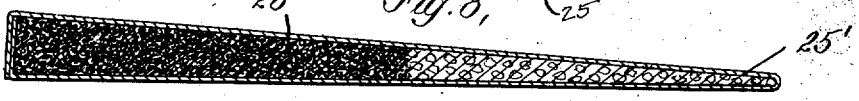
Fig. 9.
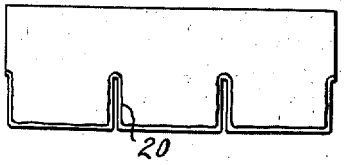
INVENTOR
Thomas Robinson
BY
Pennie, Davis, Marvin & Edmonds
ATTORNEYS Reissued May 29, 1928.

Re. 16,983

UNITED STATES PATENT OFFICE.

THOMAS ROBINSON, OF NEW YORK, N. Y.

ROOFING ELEMENT.

Original No. 1,585,692, dated May 25, 1926, Serial No. 22,057, filed April 10, 1925. Application for reissue filed September 1, 1927. Serial No. 216,970.

This invention relates to a new roofing product composed of various materials of a water-resistant character which after suitable treatment, are formed into elements of different kinds appropriate for roofing and general building purposes. More particularly, the present invention is intended to provide a new product which is cheap, durable, easily laid, and of considerable rigidity, and which is produced of ingredients which are available at low prices and may be utilized in the manufacture of the new product with little labor.

Prepared roofings of various kinds are now in wide use, and they afford numerous advantages over wooden shingles, slate, tiles and the like. Such roofings are cheaper than the older materials, may be handled and laid more conveniently, and, as compared with wooden shingles, they reduce the fire hazard to a considerable extent. These prepared products are sold commercially in various forms, such as in rolls, and as single and multiple-unit shingles, and in the types which have met with the greatest commercial success, they include a base made of an impregnated roofing felt, or of asbestos board, or of wood fibre products. To the surface of the base, prepared by well-known methods, it is usual, in nearly all forms, to apply a coating of some weather resistant product, over which is placed a coating of a good-wearing material, such as crushed slate.

A typical example of such a prepared roofing consists of a felt made of wool and rags, suitably compacted, and saturated with asphalt. Over one or both surfaces of this felt base is applied a layer of asphalt of a melting point such that it will withstand solar heat, and then over the upper surface is applied a coating of crushed slate, which is partially embedded in the coating layer before the latter has completely hardened.

Such products are satisfactory in many respects, although a roofing built up of a felt base deteriorates more or less rapidly upon exposure to the weather due to the rotting of the felt. This is particularly undesirable when the roofing elements are in the form of shingles and laid in courses, since the exposed edges warp or curl and the roof takes on an unsightly appearance. Another objection lies in the fact that these products are nearly always made of a uniform thickness from one end to the other and when laid in courses, the individual elements do not lie close together throughout their length but cavities occur at the ends of the elements. Also these units are commonly made with a comparatively thin base, which is lacking in rigidity. Another major objection is that the base products, such as felt, asbestos board, etc., are quite expensive, even though cheaper than wood.

The object of the present invention is to provide a new roofing product which may be manufactured at a lower cost than the prepared roofings now in use and in any of the shapes and forms desirable for building purposes. More specifically, I intend to provide a product which, by reason of the manner in which it is made, may have varying degrees of flexibility and which possesses the strength and durability desired for products of this character. The new product is composed throughout of materials which do not deteriorate upon exposure, and may readily be made in the tapered form, which is most suitable for roofing purposes.

While the new product may be made of various materials and in different ways, I prefer to construct it of a body of comminuted material bound together by a plastic binder and a jacket of flexible fibrous sheet material encasing the body. One convenient method of manufacture involves the use of a jacket sheet which is folded upon itself and receives the body within the fold. In making a tapered element the decrease in thickness toward the rear end would ordinarily decrease the rigidity of the element, but the new element may be made of uniform rigidity throughout its length, although the thickness is variable, by the use of comminuted inert materials graded for size, or of different specific gravities. The heavier material is used in that part of the filler which is in the thinner part of the element, when materials of different specific gravities are employed, and when the same material is used throughout the filler but the particles are of varying sizes, then the larger particles are arranged so as to lie in the thinner part of the filler, while the smaller particles lie in that part of the filler which occupies the thicker or butt end of the element. The desired result is brought about by a proper grading or proportioning of the ingredients in the filler, and a uniform rigidity throughout the element can readily be obtained in the manner presently to be described, even though the thickness of the element may vary within wide limits from one end to the other.

For a better understanding of the invention, reference will now be made to the accompanying drawings, in which, Figs. 1 and 2 are face views of multiple unit and single unit shingles, respectively, Fig. 3 is a face view of a modified form of single unit element, Fig. 4 is a longitudinal sectional view of one form of the new product, Fig. 5 is a sectional view on an enlarged scale of a portion of the element shown in Fig. 4, and taken on the line 5—5 of that figure, Fig. 6 is a sectional view showing a portion of the end of the novel product at one stage in the maufacture, Fig. 7 is a longitudinal sectional view of a modified form of element, Fig. 8 is a longitudinal sectional view of another modification, and Fig. 9 is a face view of a completed three unit shingle.

Referring now to these drawings, there is shown in Fig. 1, a three unit strip shingle 11 provided with cut-out indentations 12, in its forward edge. Similar cut-outs 13 of half width are formed at its side edges and when a series of these units is laid in a course, the cut-outs give the intervening areas 14 the appearance of spaced single shingles, and the rear ends of the cut-outs being concealed in the completed roof by the butts of the shingles in the overlapping course.

In Figs. 2 and 3 are shown single elements, the form shown in Fig. 2 being made with cut-outs 15 along its side edges, while the unit shown in Fig. 3 is intended to be laid with its edges 16 spaced from those of the next adjacent unit during the laying operation.

The new product may be made in any of the forms shown and is preferably given a tapered cross-section from front to rear. One form of the product illustrated in Figs. 4 and 5 may consist of a jacket sheet 17 which is substantially twice as long as the length of the unit and folded transversely upon itself, as at 18. This sheet may be made of various materials, of which an asphalt-impregnated paper is typical. It is preferably, though not necessarily, water-resistant and should have a fair degree of strength. It may serve to confine the material of which the new product is principally made, during the course of manufacture, and also contributes a certain amount of strength and durability to the final product. It is not depended on, however, for its water-proofing qualities, nor for its rigidity, and accordingly, various materials other than asphalt paper will suggest themselves to those skilled in the art as being useful for the purpose, although asphalt paper is desirable because it is, among other things, of a low cost. For example, asbestos paper or a coarse grade of paper not impregnated, may be used.

In the production of the element illustrated in Figs. 4 and 5, which includes a jacket sheet folded upon itself, the first step in the process of manufacture may be that of preparing the sheet of proper dimensions and folding it transversely, after which the sheet may be supported in any appropriate way, preferably with the halves of the sheet at either side of the fold relieved from strain and spaced apart according to the thickness of the element to be produced. When a tapered element is to be made, the sides of the sheet are supported in diverging relation. Into the fold of the sheet there is now introduced the filler, which is made up of a comminuted inert material, together with a plastic binding compound. This inert material may be of various kinds, as, for example, crushed slate, crushed petroleum coke, infusorial earth, sand, gravel, pumice stone, with which may be mixed ground cork of fibrous products such as asbestos, peat, and the like. The natural product known as "asphalt sand" may also be used. The plastic binding compound is preferably a bituminous substance, such as asphalt.

In the utilization of these materials in the production of roofing elements, I find that a tapered element which is of superior quality, due to its substantially uniform rigidity, may be made by employing a mixture of such inert materials for the filler, this mixture being made up of materials which are graded as to size, so that the density of the filler may be controlled, or of two or more materials which have different specific gravities. I have found that when the filler or body of the element is made of crushed slate, the particles of which vary from a fine dust to 1/8″ in size, for example, with asphalt as the plastic compound, this element has a substantially uniform rigidity throughout when the filling operation is carried on under such conditions that the coarser particles collect in the depth of the fold; that is, in the thinner part of the element. At the butt end of the element the particles of slate are of much smaller size, but the element has substantially the same rigidity in this part as at the thin end on account of the fact that although the particles of slate are finer, still there is a greater thickness of filler present. I have found that the same result can be obtained by employing comminuated materials in the filler which have different specific gravities, producing these elements under such conditions that the heavier materials occupy the thinner parts of the element. Under some conditions I contemplate that more than two materials of different specific gravities may be employed for the purpose, the proportions depending on the type of element to be made, its dimensions, etc., but in this second case the result is the same as before. In the thinner parts of the element the filler contains heavier particles of inert material, while on account of the greater quantity of filler present in the butt end of the element, the use of lighter comminuted materials in the filler does not reduce the rigidity to any considerable extent, and, in fact, a substantially uniform rigidity may be secured from one end of the element to the other by a proper selection of these materials, and by properly proportioning the quantities which are employed.

In carrying out the process, the inert material is first graded as to size or when a mixture of two materials of different specific gravities is employed, the quantities are properly proportioned so that the rigidity of the final product may be that desired. After the grading operation is completed, the inert materials used in the body are preferably mixed with the plastic compound and continuously agitated. The plastic compound is kept fluent by heat, and when a quantity of the filler is introduced into the fold of the jacket, the desired proportion of coarse and fine particles, or light and heavy particles, is included. When slate and asphalt are employed, I have found it desirable to heat the slate to a temperature substantially that at which asphalt melts, and I have also found that since the melting point of the asphalt employed will, to some extent, determine the rigidity of the final product, because the stiffer the asphalt becomes on hardening, the higher the melting point it has, the asphalt will also be selected in accordance with the type of product which is to be produced. The asphalt should, of course, be selected in any event so as to withstand solar heat without softening. When such a plastic matrix is introduced into the fold of the jacket, the heavier particles tend to sink into the depth of the fold, while the lighter particles, some of which may be almost a dust, will remain suspended. This condition continues until the asphalt sets, and the desired disposition of the particles of different sizes is thus brought about.

When materials of different specific gravities are employed, substantially the same filling method is made use of. The matrix consists of a quantity of a plastic composition, together with comminuted inert materials of different specific gravities, and in the desired proportions, which will depend on the rigidity which the final product is to have. The stiffer the product to be made, the larger the proportion of the heavier inert material. When this filler is introduced into the fold, the heavier inert material sinks into the bottom of the fold, thus occupying the position which it is intended to take, while the lighter materials remain more or less in suspension and occupy the butt end of the element. It is possible to introduce materials of different specific gravities into the fold in separate layers, if desired, pouring the plastic compound over them after they are in position. In some instances this method is preferable.

In the event that the comminuted material which is employed with the plastic substance to form the body, is lighter than the plastic substance, for instance, if the body is made of a mixture of asphalt and infusorial earth or asbestos, then, owing to the difference in specific gravity between the comminuted material and the asphalt, the comminuted material will, to a considerable extent, remain in suspension while the element is being formed. Consequently, in the bottom of the fold of the sheet the body will consist almost entirely of asphalt, while the comminuted material will lie in that part of the body remote from the fold. In this case the density of the body will vary from the line of folding outwardly, and, as before the denser portions will lie nearer the fold. However, in this case the desired rigidity is secured because the thinner parts of the body are occupied by heavier material, namely, the asphalt, and the parts of the body where the comminuted material appears, and which are therefore of less density, have an increased thickness.

After the body has been formed encased within the jacket and the plastic material has become fairly hard, the element is subjected to finishing operations and if cut-outs are to be formed, these are made by suitable cutting devices. Since the cutting operation is carried on before the filler has completely set, the butt end may be easily molded to give the element a splay edge as indicated at 20. Preferably the tapering of the butt is continuous throughout the cut-out indentations. If desired, the butt end of the element may be finished by causing the edges of the sheet to overlap so as to occupy the position illustrated in Fig. 7. For this purpose the jacket used is somewhat longer than the body so that parts 21 and 22 of the jacket as illustrated in Fig. 6, lie beyond the end of the body. After the filler has been placed in position, and preferably while it is still plastic, these extending edges are turned inwardly, one upon the other, so that at the butt end the filler is enclosed in a double thickness of the sheet.

After the cut-outs have been formed, or immediately after the filler has set sufficiently, if the element is to be without cut-outs, the element is coated throughout with a thin layer 23 of a water-resistant compound, preferably of a plastic character which will harden on cooling. Various bituminous products such as asphalt are suitable for the purpose. This coating layer seals the filler and makes the element waterproof, as well as helps to protect the reinforcing sheet from wear. Over the sealing coat, may be applied a thin layer 24 of crushed slate, crushed glass, etc., which provides a wear surface and enhances the appearance of the finished product.

In the element illustrated in Fig. 4, the comminuted filling material is shown as being of substantially the same size throughout the body of filler, and in this element the ends of the jacket at the butt end of the shingle are overlapped and the layer of crushed slate or the like, extends over the entire upper surface of the element and around the butt end. The element shown in Fig. 7 is a tapered element, in which comminuted materials of two different specific gravities are employed. In this element, in which the filler may be considered to consist of a mixture of crushed slate and ground cork, the slate is shown at 25 as occupying the thin end of the element, while the larger particles of cork are represented as at 26 in the butt end of the element. In Fig. 8 there is shown an unfinished element in which a single kind of comminuted material is employed, but having particles of different sizes. In this element the inert material may be crushed slate, for example, and the heavier particles occupy the thin end of the shingle, as indicated a 25′, while the lighter particles which remain substantially suspended in the filler, occupy the space indicated at 26′. It will be understood that the line of demarkation between the spaces occupied by the different kinds of material or the different sizes of the same material, is not as distinct as shown in the drawings, where two quite distinct regions are indicated merely for purposes of greater clarity in illustration.

It will be seen that this new product may be made of any desired thickness, and that no difficulty is involved in producing tapered products. In its completed form all the edges where the filler is exposed, are protected by a sealing coating, which not only covers the side and end edges of the filler, but also the edges of the cut-out indentations, so that there is no possibility of water entering between filler and the jacket, so as to cause a separation. Elements of varying degrees of rigidity or flexibility may be produced by the proper selection of grades or kinds of comminuted material employed, and the process of manufacturing the product does not differ in producing elements of varying characteristics, except in the selection of the proportions of different kinds of inert materials which are used.

It will be seen that the roofing product may be made at extremely low cost since all the materials employed in its construction are available at low prices, and no considerable amount of labor is employed. One of the principal items of expense of the prepared roofings now sold, and which include a felt base, is the felt, which is comparatively expensive. Also, it is this part of the element which deteriorates most rapidly when in use. In the manufacture of a unit with a felt base, it is difficult to produce a shingle of tapered configuration, and also felt roofing shingles have a very considerable degree of flexibility, which, to some extent, reduces their popularity. The present product, however, may be manufactured in any shape and form, and may be given a tapered cross-section without additional cost or difficulty. It may vary within wide limits as to rigidity, and is suitable for all building purposes. I have found that it may be readily nailed in place, and may be sawn with ease, and although it will ordinarily be made in elements which are comparatively stiff, still it is not brittle and if subjected to blows the filler will not crack or break.

I claim:

1. A roofing element comprising the combination of a sheet doubled upon itself to provide a fold, and a body composed of a hardened plastic substance and comminuted materials graded so that the density of the body varies in different parts thereof, the rigidity being substantially uniform.

2. A roofing element comprising the combination of a sheet doubled upon itself to provide a fold, and a body composed of a bituminous matrix and an aggregate graded as to weight and so disposed that the heavier particles lie at the fold and the particles gradually decrease in weight from the fold to the opposite end of the element.

3. A roofing element comprising the combination of a sheet doubled upon itself to provide a fold with the plies of the sheet diverging from the line of folding, and a body composed of a bituminous matrix and comminuted material lying in the fold, this body being so formed that its density varies in different parts thereof, with the denser portions lying nearer the fold, and the edges of the sheet remote from the fold being turned inwardly to overlie the end of the body.

4. A roofing element comprising the combination of a sheet doubled upon itself to provide a fold and a body composed of a hardened plastic substance and comminuted material lying within the fold, this body being so formed that its density varies in different parts thereof, with the denser portions lying nearer the fold.

5. A tapered roofing element comprising the combination of a sheet doubled upon itself to provide a fold, the plies of the sheet diverging from the line of folding, a body composed of a hardened plastic substance and comminuted materials lying within the fold, the body being so formed that its density varies in different parts thereof, with the denser portions lying nearer the fold, a sealing coat of asphalt applied to the outer face of the sheet and the exposed edges of the body, and a layer of crushed mineral material embedded in the asphalt on one face of the sheet.

6. A roofing element comprising in combination a sheet doubled upon itself to provide a fold with the plies of the sheet diverging from the line of folding, and a body lying within the sheet and comprising a quantity of particles of crushed slate of different sizes, the larger particles occupying that part of the body lying nearest the line of folding, and the size of the particles decreasing toward the opposite end of the shingle.

7. A tapered shingle comprising in combination, a sheet of asphalt paper doubled upon itself to provide a fold, with the plies of the sheet diverging from the line of folding, a body lying within the sheet and comprising particles of crushed slate of different sizes, the larger particles occupying that part of the body lying nearest the line of folding, and a sealing coat of asphalt capable of withstanding solar heat, applied to the outer faces of the sheet and the exposed edges of the body.

8. A tapered shingle comprising in combination, a sheet of asphalt paper doubled upon itself to provide a fold, with the plies of the sheet diverging from the line of folding, a body lying within the sheet and comprising a bituminous matrix and a mineral aggregate, the body being so formed that its density varies in different parts thereof with the denser portion lying nearer the fold, a plurality of cut-out indentations being formed in one edge of the sheet and body, and a sealing coat of asphalt applied to the outer faces of the sheet and the exposed edges of the body, including the sides of the indentations.

9. A tapered shingle comprising the combination of a sheet of fibrous material impregnated with a waterproofing compound doubled upon itself to provide a fold, a body of crushed slate and an asphaltic binder lying within the fold, this body being of gradually increasing thickness from the fold and the plies of the sheet on either side of the fold covering the opposite faces of the body and extending beyond the latter, the extending portions being folded over the end of the body in overlapping relation whereby the body is encased within the sheet, and a sealing coat of asphalt covering the outer faces of the sheet and the portions of the body exposed at either edge of the latter.

10. A roofing element comprising the combination of a body composed of a mass of solid material and a hardened plastic substance permeating said mass, this body being so formed that its density varies in different parts thereof, the rigidity being substantially uniform, and fibrous sheet material covering opposite faces of the body and securely affixed thereto.

11. A roofing element comprising the combination of a body composed of a mass of solid material and a hardened plastic material permeating the said mass, this body tapering in thickness from one edge to the other and the body being so formed that its density varies in different parts thereof, with the denser portions lying near the thin edge of the body, and fibrous sheet material covering opposite faces of the body and securely affixed thereto.

12. A roofing element comprising in combination a body comprising a quantity of particles of solid material of different sizes, this body tapering in thickness from one edge to the other, with the larger particles occupying that part of the body lying near the thin edge and the size of the particles decreasing toward the opposite edge of the element, and sheet material covering opposite faces of the body and securely affixed thereto.

13. A roofing element tapering in thickness from one end to the other and comprising in combination a body made up of solid material and a hardened plastic substance, the body being so formed that its density varies in different parts thereof, with the denser portions lying near the thin end of the body, sheet material covering opposite faces of the body and securely affixed thereto, and a sealing coat of asphalt applied to the outer faces of the sheet material and the exposed edges of the body.

14. A roofing element tapering in thickness from one end to the other comprising in combination a body made up of a mass of solid material and a hardened plastic substance permeating the said mass, this body being so formed that its density varies in different parts thereof, with the rigidity substantially uniform, sheet material covering opposite faces of the body and securely affixed thereto, a plurality of cut-out indentations being formed in one edge of the body and sheet material, and a sealing coat of asphalt applied to the outer faces of the sheet and the exposed edges of the body, including the sides of the said indentations.

15. A roofing element tapering in thickness from one end to the other and comprising in combination a body of particles of mineral material and a bituminous substance, the body being so formed that its density varies in different parts thereof, with the greatest density nearest the thin end of the element, fibrous sheet material defining opposite faces of the body, and a layer of water-proof sealing material applied to the outer faces of the sheet material and the exposed edges of the body.

16. A roofing element tapering in thickness from one end to the other, comprising the combination of a body composed of asphalt and comminuted material, the body being so formed that its density varies in different parts thereof, with the denser portions lying near the thin end of the body, fibrous sheet material defining opposite faces of the body, a sealing coat of asphaltic material applied to the outer faces of the sheet material, and the exposed edges of the body, and a layer of crushed mineral material embedded in the asphalt on one face of the sheet and at the thick end of the element.

In testimony whereof I affix my signature.

THOMAS ROBINSON.